US008461473B2

(12) United States Patent
Baum (10) Patent No.: US 8,461,473 B2
(45) Date of Patent: Jun. 11, 2013

(54) EXTERNAL CORROSION PROTECTION FOR UNDERGROUND PIPES (75) Inventor: Harry L. Baum, Frisco, CO (US)

(73) Assignee: WPW, LLC, Breckenridge, CO (US)

(*) Notice: Subject to any disclaimer, the term of this patent is extended or adjusted under 35 U.S.C. 154(b) by 837 days.

(21) Appl. No.: 12/606,045

(22) Filed: Oct. 26, 2009

(65) Prior Publication Data
US 2010/0102038 A1 Apr. 29, 2010

Related U.S. Application Data (60) Provisional application No. 61/108,825, filed on Oct. 27, 2008.

(51) Int. Cl.
B23K 11/00 (2006.01)
G01R 27/08 (2006.01)

(52) U.S. Cl.
USPC ............ 219/117.1; 324/722; 138/97; 138/98

(58) Field of Classification Search
USPC ................... 219/117.1; 138/98, 97; 322/722
See application file for complete search history.

(56) References Cited

U.S. PATENT DOCUMENTS 3,331,621 A * 7/1967 Bagnulo .......................... 285/47
3,623,968 A * 11/1971 Bohne ....................... 204/196.15
3,843,170 A * 10/1974 Bagnulo .......................... 285/55
3,871,687 A * 3/1975 Dockree .......................... 285/53
3,892,032 A * 7/1975 Bagnulo ....................... 29/455.1
3,994,794 A * 11/1976 Bohne ....................... 204/196.16
4,011,652 A * 3/1977 Black ........................... 29/455.1
4,098,451 A * 7/1978 Smith et al. .................... 228/119
4,099,661 A * 7/1978 Dick et al. ..................... 228/107
4,174,124 A * 11/1979 Dockree .......................... 285/54
4,228,399 A * 10/1980 Rizzo et al. .................... 324/425
4,515,861 A * 5/1985 Arup ............................. 428/450
4,934,952 A * 6/1990 Banker ........................... 439/92
5,176,025 A * 1/1993 Butts .......................... 73/40.5 R
5,274,897 A * 1/1994 Mieszelewicz et al. ........ 29/458
5,377,898 A * 1/1995 Persson ......................... 228/107
6,167,913 B1 * 1/2001 Wood et al. .................... 138/98
6,214,203 B1 * 4/2001 Horton .......................... 205/724
7,104,147 B2 * 9/2006 Pots et al. .................... 73/865.8
2008/0178955 A1 * 7/2008 Bryant et al. .................. 138/98
2009/0272452 A1 * 11/2009 Cain et al. ...................... 138/97

* cited by examiner

Primary Examiner — Ha Tran T Nguyen
Assistant Examiner — Jordan Klein
(74) Attorney, Agent, or Firm — Faegre Baker Daniels LLP (57) ABSTRACT A method for establishing or restoring electrical continuity between metal pipe sections in pipeline rehabilitation according to embodiments of the present invention includes, from an inside of a pipe having first and second pipe sections, removing a layer of the first pipe section at a first location, removing a layer of the second pipe section at a second location, electrically connecting a spanner at the first location and the second location, deploying a tubular liner along the inside of the pipe, injecting grout between the tubular liner and the inside of the pipe, and distributing the grout between the tubular liner and the inside of the pipe, wherein a first radial distance from the inside of the pipe to the innermost extent of the spanner is less than or equal to a second radial distance from the inside of the pipe to the tubular liner.

19 Claims, 7 Drawing Sheets

EXTERNAL CORROSION PROTECTION FOR UNDERGROUND PIPES

CROSS-REFERENCE TO RELATED APPLICATIONS

This application claims the benefit of U.S. Provisional Patent Application Ser. No. 61/108,825, filed on Oct. 27, 2008, and entitled "External Corrosion Protection for Underground Pipes," which is incorporated by reference herein in its entirety.

TECHNICAL FIELD

Embodiments of the present invention relate generally to corrosion protection, and more specifically to establishing or restoring electrical continuity between underground pipe sections.

BACKGROUND

Underground metallic pipes, especially cast and ductile iron pipes, are subject to corrosion on their outer surface. Current methods for external corrosion protection include lining the exterior surface of pipes with a corrosion-resistant liner, such as a polyethylene liner, prior to installation and burial and/or equipping the installed pipe with cathodic corrosion protection. However, both methods require action taken during installation of the pipe (e.g. installing pipe with liner, or attaching conductivity straps across pipe sections to be buried). For older pipe installations that lack pre-installed conductivity straps, or whose conductivity straps have eroded or corroded over time, conductivity between pipe sections is often lacking due to gaps between the sections and/or insulative O-rings or gaskets applied between the pipe sections. Often, the only way to achieve cathodic corrosion protection for such older pipe installations is to unearth them and replace them.

SUMMARY

A method for establishing or restoring electrical continuity between metal pipe sections according to embodiments of the present invention includes, from an inside of a pipe having at least a first pipe section and a second pipe section, electrically connecting a spanner to the first pipe section and to the second pipe section along the inside of the pipe. The spanner may be at least partially conductive. Electrical continuity and/or conductivity tests may be performed between pipe sections, and a corrosion protection system (e.g. impressed current or basic galvanic anode) may be electrically connected to one or more of the pipe sections, according to embodiments of the present invention.

A layer of the inside of the pipe may be removed (e.g. by drilling a hole, milling, grinding, or "roughing up") at the location at which the conductivity spanner is connected to the pipe segments. From the inside of the pipe, the spanner may be welded to the pipe segments, for example at the locations where a layer has been removed, according to embodiments of the present invention. The spanner may be electrically connected to the pipe segments in other ways, including but not limited to soldering or adhering.

Establishing or restoring electrical continuity between pipe segments may be performed in some cases prior to a pipeline rehabilitation, in which a tubular liner is deployed along the inside of the pipe, grout is injected between the tubular liner and the inside of the pipe, and the grout is distributed between the tubular liner and the inside of the pipe. A first radial distance from the inside of the pipe to the innermost extent of the spanner may be less than or equal to a second radial distance from the inside of the pipe to the tubular liner, according to embodiments of the present invention.

The spanner may be one of a plurality of spanners electrically connected to the first pipe section and to the second pipe section. The plurality of spanners may be located in a radially symmetrical configuration, such as, for example, that a circumferential distance between each adjacent spanner of the plurality of spanners is substantially the same.

An additional method for establishing or restoring electrical continuity between metal pipe sections in pipeline rehabilitation includes, from an inside of a pipe having at least a first pipe section and a second pipe section, removing a layer of the first pipe section at a first connection location, removing a layer of the second pipe section at a second connection location, electrically connecting a spanner to the first pipe section at the first connection location and to the second pipe section at the second connection location, deploying a tubular liner along the inside of the pipe, injecting grout between the tubular liner and the inside of the pipe, and distributing the grout between the tubular liner and the inside of the pipe, wherein a first radial distance from the inside of the pipe to the innermost extent of the spanner is less than or equal to a second radial distance from the inside of the pipe to the tubular liner. According to various embodiments of the present invention, the pipe may be buried, the electrical connection may be accomplished by welding and/or soldering, and the spanner may be copper. Removing a layer of the first and/or second pipe sections may include drilling a hole at the first and/or second connection locations.

Yet another method for establishing or restoring electrical continuity between metal pipe sections in pipeline rehabilitation includes, from an inside of a pipe having at least a first pipe section and a second pipe section, removing a layer of the first pipe section at a first connection location, removing a layer of the second pipe section at a second connection location, electrically connecting a spanner to the first pipe section at the first connection location and to the second pipe section at the second connection location, and rehabilitating the pipe to give the pipe a new inner diameter, wherein a first radial distance from the inside of the pipe to the innermost extent of the spanner is less than a second radial distance from the inside of the pipe to the new inner diameter.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention and of the appended claims.

DETAILED DESCRIPTION

Figure 1:
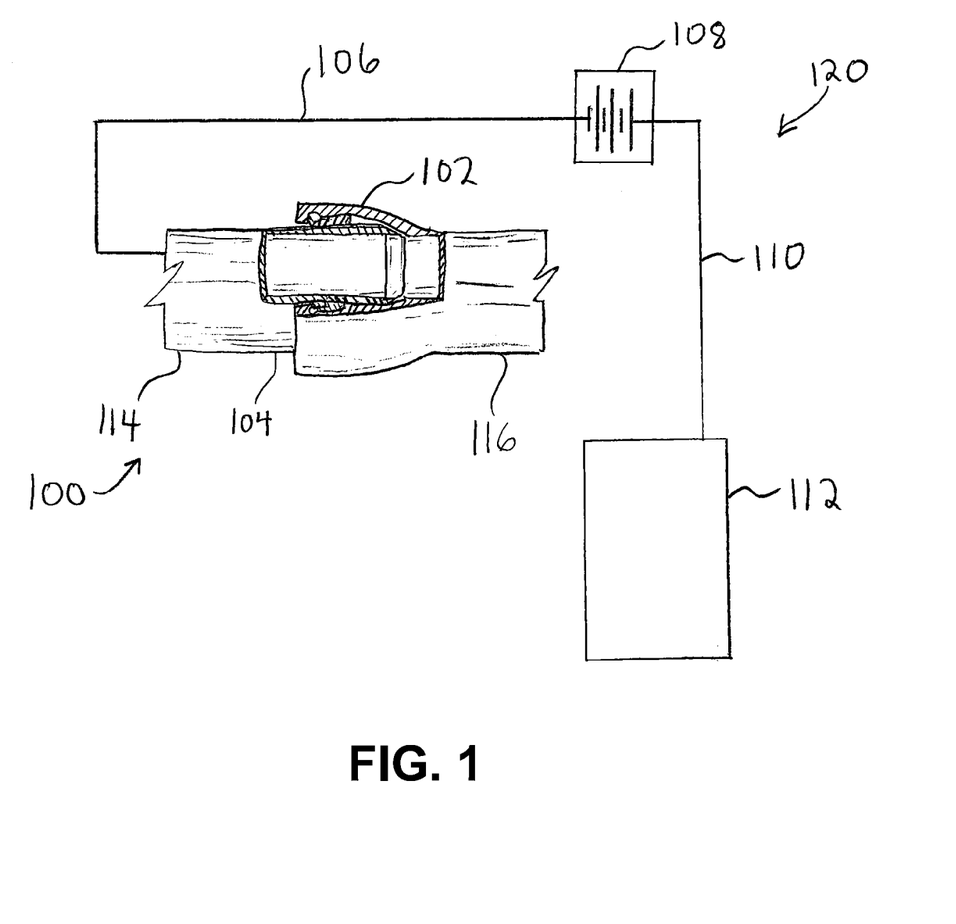
FIG. 1 illustrates a partial cross sectional perspective view of a joint of two pipe sections with a galvanic external corrosion protection system applied, according to embodiments of the present invention.

Embodiments of the present invention relate to adding and/or restoring electrical continuity between installed pipe segments to enable galvanic external corrosion protection. FIG. 1 illustrates a partial cross sectional perspective view of a joint 100 of two pipe sections 114, 116 with a galvanic external corrosion protection system 120 applied, according to embodiments of the present invention. Each pipe segment 114 includes a bell end 102 and a spigot end 104. The spigot end 104 fits inside of the bell end 102 to form a pipe joint 100.

A galvanic external corrosion protection system 120 is in electrical communication with pipe segment 114. A wire 106 connects pipe segment 114 with a potential source 108, and wire 110 connects potential source 108 with an anode 112, according to embodiments of the present invention. The system 120 depicted is an impressed current system, in which the voltage source 108 drives an electronic current through pipe segment 114, through wires 106, 110, into anode 112. An impressed current of electrons then flows between anode 112 and pipe segment 114. A basic galvanic anode system may also be employed in a similar fashion by omitting the potential source 108, according to embodiments of the present invention. Such systems cause the pipe segment itself 114 to act as the cathode in an electrochemical reaction. Whether the external corrosion system 120 will also work to protect not only pipe segment 114, but also pipe segment 116, depends on the presence of electrical conductivity and/or continuity between the pipe segments 114, 116. This is particularly true for lengths or series of pipe segments that are inaccessible because they are buried under earth and/or water or other corrosive environments.

Figure 2:
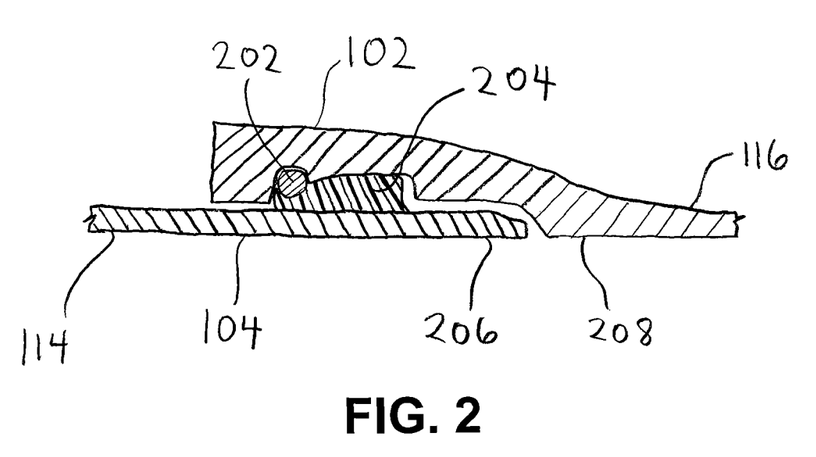
FIG. 2 illustrates an enlarged cross-sectional view of an outer portion of the joint of FIG. 1, according to embodiments of the present invention.

FIG. 2 illustrates an enlarged cross-sectional view of an outer portion of the joint 100 of FIG. 1, according to embodiments of the present invention. Often, a seal is included between the bell end 102 and the spigot end 104 in order to make a watertight connection between them. The seal may include, for example, an o-ring 202 and/or an elastomeric seal 204. Such sealing elements 202, 204 often insulate and electrically isolate the spigot end 104 from the bell end 102, such that galvanic corrosion protection applied to the spigot end 104 does not operate on the bell end 102 as well. Pipe installations in recent years sometimes include externally applied conductivity straps connecting adjacent pipe segments. However, older pipe installations often do not include any conductivity straps between adjacent pipe segments, or often include conductivity straps that have been worn down and/or corroded themselves. Such older pipe installations are often unearthed at great expense, rather than rehabilitated, due to the desire for external corrosion protection.

According to embodiments of the present invention, a length of two or more buried adjacent pipe segments may be prepared for external corrosion protection without digging up the pipe segments. First, a conductivity and/or continuity test may be performed by connecting wires to each exposed end of the series of adjacent pipe segments and testing for electrical continuity. According to some embodiments of the present invention, such a continuity test includes a test for conductivity and/or resistivity. A calculation may be made as to whether the measured conductivity will comport with the current requirements of an external corrosion protection system, according to embodiments of the present invention. If there is no electrical continuity across the pipe segments, or if the conductivity is not sufficient to support the desired external corrosion protection system, then further steps may be taken to electrically connect the pipe segments, according to embodiments of the present invention.

Prior to electrically connecting the two pipe segments, each segment 114, 116 may be prepared to receive a connection. Often, the inner diameter of older pipes is corroded and/or encrusted. A drill bit and/or milling bit and/or sander and/or grinder and/or the like may be used to remove any outer layer or layers of encrustation and/or corrosion on each of the segments 114, 116 in order to fully expose the bare metal below, according to embodiments of the present invention. This grinding preparation may be performed at locations 206 and 208, according to embodiments of the present invention.

Figure 3:
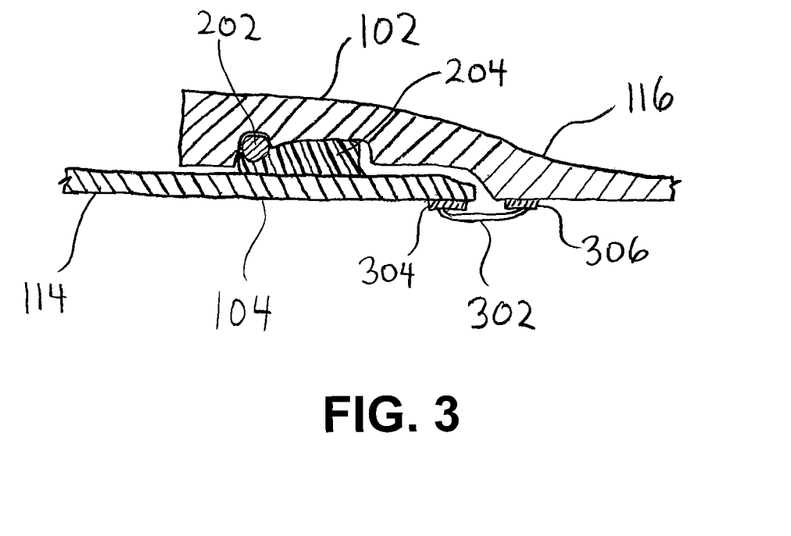
FIG. 3 illustrates the enlarged cross-sectional view of FIG. 2 including a conductivity spanner connected between pipe segments, according to embodiments of the present invention.

As illustrated in FIG. 3, a spanner 302 may be welded, soldered, or otherwise connected between segments 114 and 116. The spanner 302 may be a conductivity strap, for example. Welds 304, 306 are shown at locations 206, 208. Welds 304, 306 may alternatively be plates, according to embodiments of the present invention. According to some embodiments of the present invention, the spanner 302 may be electrically connected to each pipe segment 114, 116 by welding, by soldering, by adhesive that maintains electrical contact, by other mechanical connectors such as a clamp and/or a bolt installed into the outer pipe diameter, and/or by similar means. For a given pipe geometry and diameter, a desired spanner 302 installation solution may involve whichever mechanism is easier to install with a remote-operated cart or robot, according to embodiments of the present invention. The spanner 302 may be, for example, a copper strap connecting segments 114, 116. The spanner 302 may alternatively be made of other conductive materials. According to some embodiments of the present invention, the spanner 302 is a wire, a strap, a band, a series of wires, a bracket, a bar, and/or the like.

Although FIG. 3 depicts a spanner 302 installation at a single location, a similar spanner 302 installation may be made at any location around the inner diameters of the pipe segments 114, 116 at the joint 100; in fact, multiple spanner 302 installations may be made at the same joint 100, according to embodiments of the present invention.

According to some embodiments of the present invention, the spanner 302 installation is flush or substantially flush with the inner diameter of the pipe segments 114, 116 at the joint 100. According to other embodiments of the present invention, the spanner 302 installation protrudes from the inner diameter of both pipes. According to some embodiments of the present invention, each pipe segment 114, 116 and others may first be conductively connected with conductivity spanners 302, and then rehabilitated with a liner similar to a liner with grout hooks as described in U.S. Pat. No. 6,167,913, issued on Jan. 2, 2001, and entitled "Pipe Liner, a Liner Product and Methods for Forming and Installing the Liner," which is incorporated by reference herein for all purposes. According to embodiments of the present invention, such rehabilitation may be made by the methods and systems described in U.S. patent application Ser. No. 11/842,933 filed on Aug. 21, 2007, and entitled "Systems and Methods for Pipeline Rehabilitation Installation," published as U.S. Patent Application Publication No. 2008/0178955 on Jul. 31, 2008, which is incorporated by reference herein for all purposes. According to some embodiments of the present invention, installing conductivity spanners 302 and then rehabilitating and relining the pipeline as described above results in the spanner 302 installation being completely embedded within the grout between the liner and the pipe, without interfering with the substantially circular circumference of the inner pipe diameter and/or inner liner diameter at the joint 100.

Figure 4:
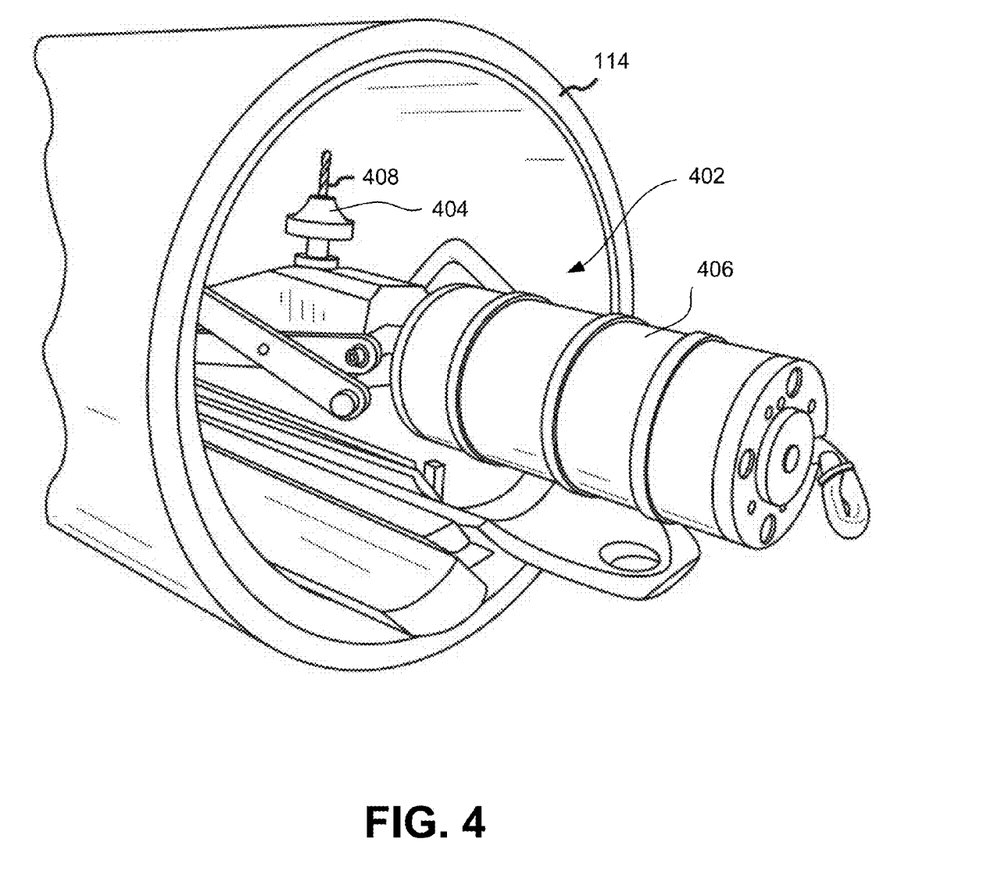
FIG. 4 illustrates a back perspective view of a mechanical cart for use in installing a conductivity spanner, according to embodiments of the present invention.

FIG. 4 illustrates a back perspective view of a mechanical cart 402 for use in installing a conductivity spanner, according to embodiments of the present invention. Such a movable cart 402 is a three axis movable motor assembly positioned on a skid lift mechanism, according to embodiments of the present invention. The cart may be similar to the cart described in U.S. patent application Ser. No. 12/363,782, entitled "Systems and Methods for Locating and Restoring Service Lines in Pipeline Rehabilitation," and filed on Feb. 1, 2009, and PCT Patent Application Serial No. PCT/US2009/032784, with the same title and filing date, published as International Publication Number WO 2009/097598, both of which are incorporated by reference herein for all purposes.

Such a cart has a mechanical arm that may be raised closer to, and lowered away from, the inner pipe diameter. The mechanical arm may be configured to receive and utilize various bits and/or implements such as, for example, a drill bit, a grinding apparatus, and/or a welding apparatus, to achieve the various spanner 302 installation steps described herein, according to embodiments of the present invention. For example, the cart 402 may include a chuck 404 configured to receive a drill or mill bit 408, according to embodiments of the present invention. The drill or mill bit 408 may be used to remove an external (e.g. inner) layer of the pipe segments 114, 116, for example at locations 206, 208, as preparation for electrically connecting the spanner 302 to the pipe segments 114, 116, according to embodiments of the present invention. Removing a layer at locations 206, 208 may include "roughing up" the metal at or near those locations, according to embodiments of the present invention. Removing a layer at locations 206, 208 may also include drilling one or more holes at locations 206, 208, according to embodiments of the present invention.

Although FIG. 3 illustrates a conductivity spanner 302 protruding slightly from the inside 104 of the pipe segments 114, 116, in some cases, holes or channels may be formed in the pipe segments 114, 116 at or near the gap between the segments 114, 116, and a conductivity spanner 302 may be inserted between and electrically connected to the segments 114, 116, such that the innermost radial extent of the spanner 302 is flush or substantially flush with the inside 114 of the pipe, according to embodiments of the present invention.

Figure 5:
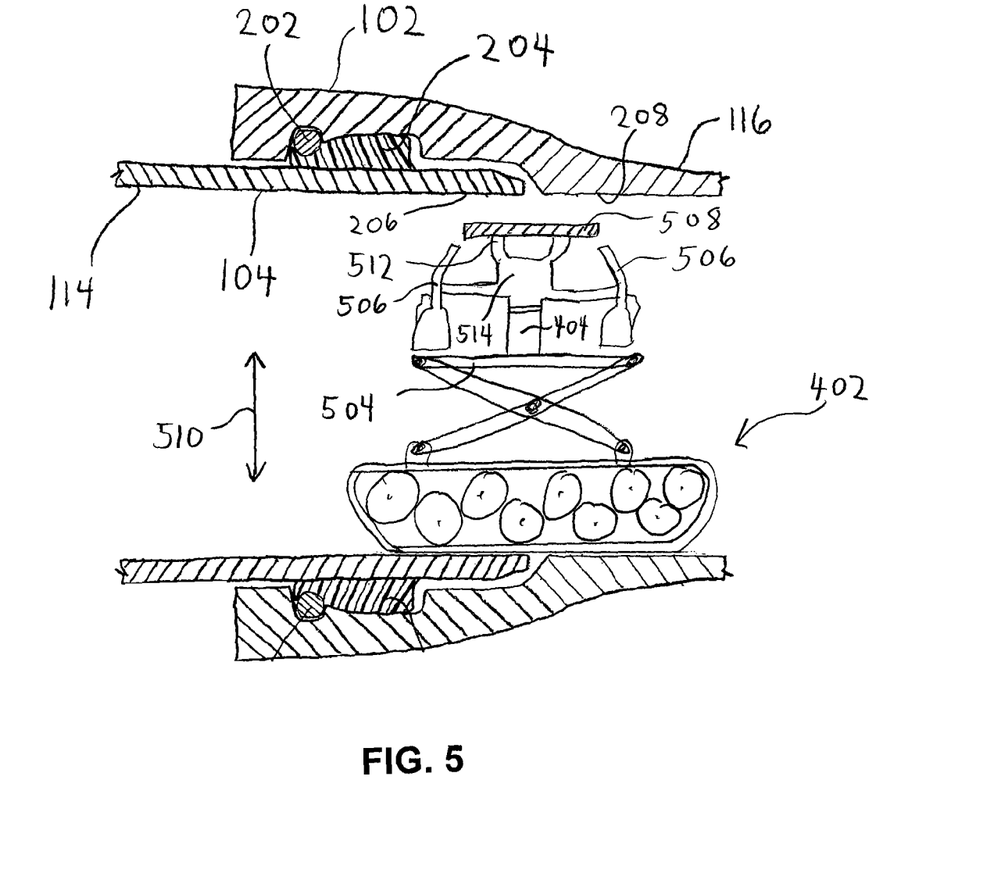
FIG. 5 illustrates a partial side cross sectional view of a cart with an attachment for electrically connecting a spanner to pipe sections, according to embodiments of the present invention.

FIG. 5 illustrates a mechanical cart 402 configured to electrically connect the spanner 508 to the pipe segments 114, 116, according to embodiments of the present invention. Cart 402 includes a platform 504 which can be moved both toward and away from the inside 114 of the pipe segments 114, 116 in the directions indicated by arrow 510. A chuck 404 mounted to the platform 504 may be configured to receive a welding apparatus bit 514, for example. The welding apparatus bit 514 may include one or more arms 512 for holding and/or positioning the spanner 508 against the pipe inside 104 during the electrical connection operation. Arms 512 may hold spanner 508 by gravity; alternatively, arms 512 may hold spanner 508 with clips or suction cups; alternatively, arms 512 may hold spanner 508 with an adhesive or other holding mechanism that substantially prevents the spanner 508 from falling off of the arms 512 prior to installation, but which is releasable, by gravity or otherwise, after installation of the spanner 508 to the pipe segments 114, 116, according to embodiments of the present invention.

The welding apparatus bit 514 may further include arms holding one or more welders 506, according to embodiments of the present invention. The welders 506 may be positioned and angled with respect to the spanner 508 such that activation of the welding energy of welders 506 results in a proper electrical attachment between the spanner 508 and pipe segments 114, 116, according to embodiments of the present invention. According to other embodiments of the present invention, the angle and/or position of the welders 506 with respect to the spanner 508 may be changed and controlled remotely, for example. In some cases, the angle and position of the welder 506 and spanner 508 is fixed with respect to the bit 514, such that simplified installation may be achieved by simply pushing the spanner 508 against the pipe sections 114, 116 at locations 206, 208, and activating the welding energy. Although welders 506 are depicted, various other devices may be used with bit 514 or similar bits to electrically attach the spanner 508 to the pipe segments 114, 116 by welding, melting, bonding, or otherwise attaching, including but not limited to one or more: torches, welders, soldering guns, glue guns, laser welders, and the like.

Figure 6:
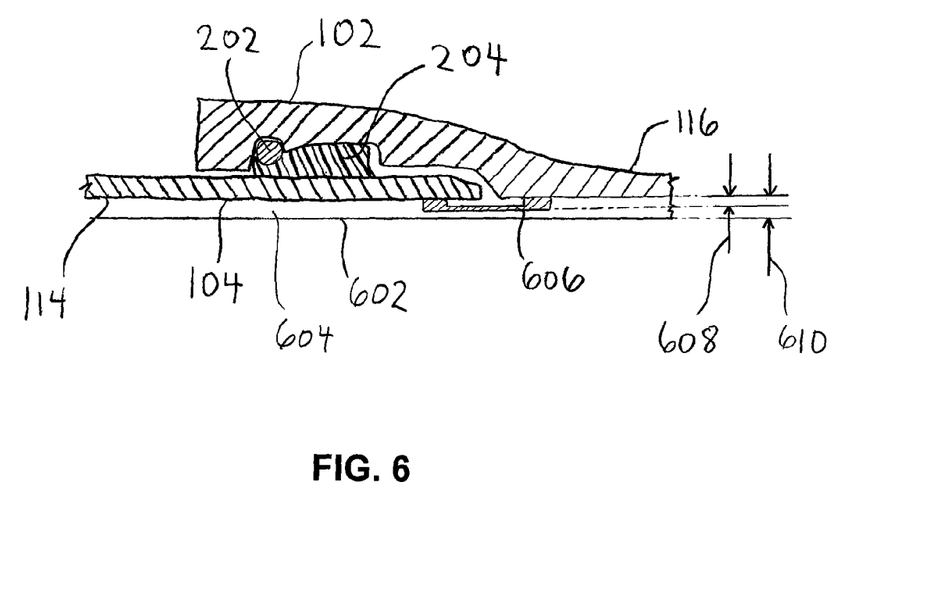
FIG. 6 illustrates an enlarged cross-sectional view of an outer portion of the joint of FIG. 1, after spanner installation and pipe relining installation, according to embodiments of the present invention.

FIG. 6 illustrates a cross sectional view of the pipe sections 114 after relining of the pipe, according to embodiments of the present invention. The pipe liner 602 defines a new inner diameter after pipeline rehabilitation. Grout 604 is distributed between the liner 602 and the inside 104 of the pipe. As illustrated in FIG. 6, a radial distance between the pipe inside 104 and the innermost radial extent of the spanner 606, labeled as distance 608, is less than or equal to a radial distance between the pipe inside 104 and the liner 602, labeled as distance 610, according to embodiments of the present invention. Thus the spanner 606 does not protrude or poke into the liner 602 or interfere with a smooth inner diameter 602 of the new relined pipe, according to embodiments of the present invention.

Figure 7:
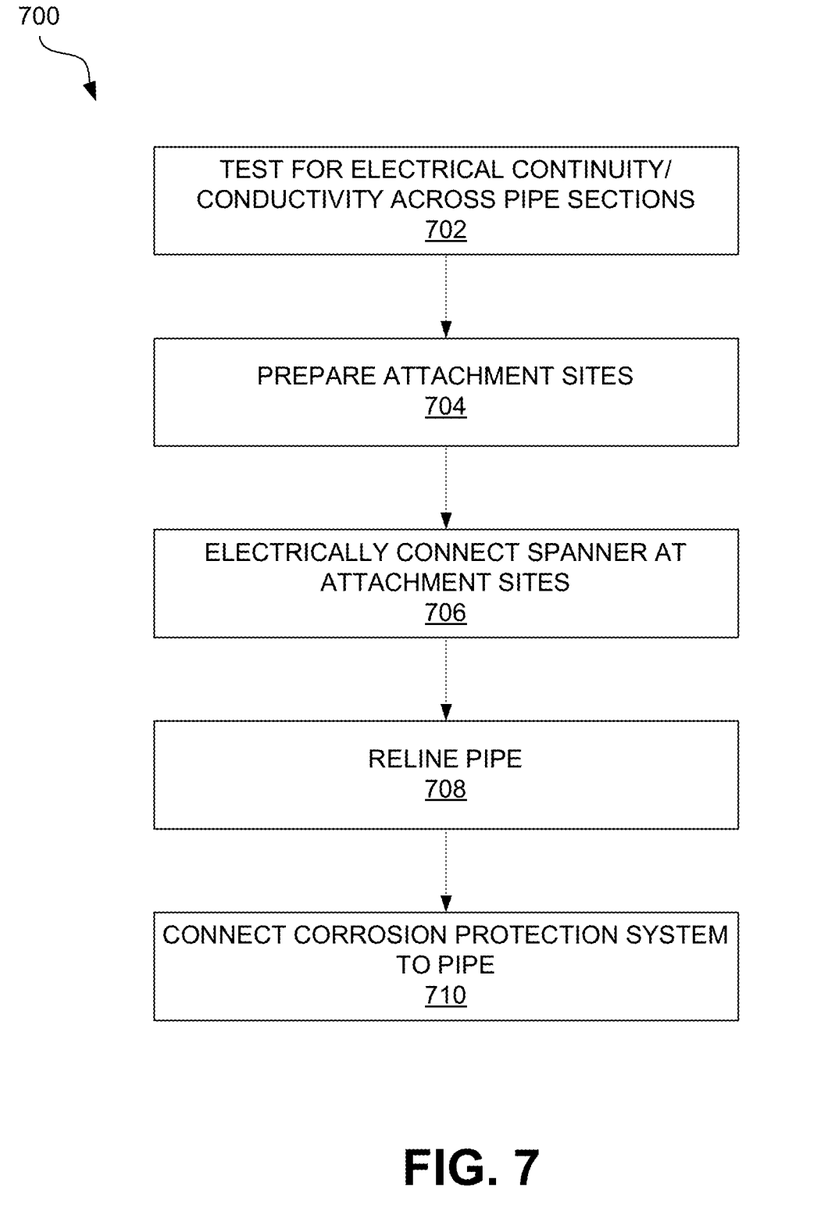
FIG. 7 illustrates a corrosion protection method, according to embodiments of the present invention.

FIG. 7 depicts a flow chart 700 illustrating a method for pipeline corrosion protection, according to embodiments of the present invention. The pipe sections may be tested for electrical continuity and/or conductivity (block 702). The attachment sites 206, 208 may be prepared, such as by removing a layer by grinding, drilling, sanding, or otherwise (block 704), as further described with respect to FIGS. 2 and 4. The conductive spanner 302 may be electrically connected to the pipe segments 114, 116 at or near the attachment sites 206, 208 (block 706). This may be accomplished with a remote controlled or automated cart 402 as further described with respect to FIG. 5, by pushing the spanner 508 against the attachment sites 206, 208 and then welding, soldering, adhering, or otherwise attaching in a way that permits sufficient electrical conductivity between the pipe sections 114, 116 and spanner 508 to support a corrosion protection system, according to embodiments of the present invention. Accomplishing one or more of these steps from inside the pipe, which may be buried, such as with a cart or other remote-controlled or automated device saves immense cost and time that would be required to dig up and replace the pipe sections.

The pipe may then be rehabilitated (block 708) by placing a liner through the pipe, injecting grout between the liner and the pipe, and rounding the liner by, for example, advancing a swab through the liner to distribute the grout between the liner and the pipe, as further described in U.S. Patent Application Publication No. 2008/0178955. A corrosion protection system may be electrically connected to the pipe (block 710), as illustrated in FIG. 1 for example, according to embodiments of the present invention.

Although a single spanner 302, 508, 606 is shown, multiple spanners may be installed at a pipe segment junction 100, according to embodiments of the present invention. Each of the multiple spanners may be installed in a radially symmetrical configuration with respect to the other spanners; for example, a circumferential distance between each adjacent spanner of two or more spanners may be substantially the same. Use of multiple spanners at the same junction may improve reliability, robustness, and may prevent corrosion protection system failure due to present or future site-specific defects, such as corrosion at a specific location at or near the spanner attachment location at the spigot end 104, for example. Use of multiple spanners may also permit similar conductivity properties to be achieved with thinner, and less obtrusive, spanners. For example, conductivity properties of a single copper spanner with a cross-sectional area of 3A may be achieved in some cases with three copper spanners each having a cross-sectional area of A, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. For example, while the embodiments described above refer to particular steps, the scope of this invention also includes embodiments having different combinations of steps and embodiments that do not include all of the described steps. Accordingly, the scope of the present invention is intended to embrace all such alternatives, modifications, and variations as fall within the scope of the claims, together with all equivalents thereof.

What is claimed is:

1. A method for establishing or restoring electrical continuity between metal pipe sections, the method comprising:
   from an inside of a pipe having at least a first pipe section and a second pipe section, electrically connecting a spanner to the first pipe section and to the second pipe section along the inside of the pipe, wherein the spanner is at least partially conductive,
   wherein electrically connecting the spanner to the first pipe section and to the second pipe section comprises electrically connecting to the spanner to the first pipe section at a first connection location and electrically connecting the spanner to the second pipe section at a second connection location, the method further comprising:
   from the inside of the pipe, removing a layer of the first pipe section at the first connection location.

2. The method of claim 1, further comprising:
   testing for electrical continuity between the first pipe section and the second pipe section.

3. The method of claim 1, further comprising:
   testing electrical conductivity between the first pipe section and the second pipe section.

4. The method of claim 1, further comprising:
   electrically connecting a corrosion protection system to the first pipe section.

5. The method of claim 4, wherein the corrosion protection system is an impressed current system.

6. The method of claim 4, wherein the corrosion protection system is a basic galvanic anode system.

7. The method of claim 1, further comprising:
   from the inside of the pipe, welding the spanner to the first pipe section at the first connection location.

8. The method of claim 1, wherein electrically connecting the spanner to the first pipe section and to the second pipe section comprises:
   from the inside of the pipe, welding the spanner to the first pipe section and to the second pipe section.

9. The method of claim 1, further comprising:
   deploying a tubular liner along the inside of the pipe;
   injecting grout between the tubular liner and the inside of the pipe; and
   distributing the grout between the tubular liner and the inside of the pipe, wherein a first radial distance from the inside of the pipe to the innermost extent of the spanner is less than or equal to a second radial distance from the inside of the pipe to the tubular liner.

10. A method for establishing or restoring electrical continuity between metal pipe sections, the method comprising:
    from an inside of a pipe having at least a first pipe section and a second pipe section, electrically connecting a spanner to the first pipe section and to the second pipe section along the inside of the pipe, wherein the spanner is at least partially conductive,
    wherein the spanner is one of a plurality of spanners electrically connected to the first pipe section and to the second pipe section.

11. The method of claim 10, further comprising:
    locating the plurality of spanners such that a circumferential distance between each adjacent spanner of the plurality of spanners is substantially the same.

12. The method of claim 10, wherein the plurality of spanners is located in a configuration that is substantially radially symmetrical.

13. A method for establishing or restoring electrical continuity between metal pipe sections in pipeline rehabilitation, the method comprising:
    from an inside of a pipe having at least a first pipe section and a second pipe section:
    removing a layer of the first pipe section at a first connection location;
    removing a layer of the second pipe section at a second connection location;
    electrically connecting a spanner to the first pipe section at the first connection location and to the second pipe section at the second connection location;
    deploying a tubular liner along the inside of the pipe;
    injecting grout between the tubular liner and the inside of the pipe; and
    distributing the grout between the tubular liner and the inside of the pipe, wherein a first radial distance from the inside of the pipe to the innermost extent of the spanner is less than or equal to a second radial distance from the inside of the pipe to the tubular liner.

14. The method of claim 13, wherein the pipe is buried.

15. The method of claim 13, wherein electrically connecting comprises welding.

16. The method of claim 13, wherein electrically connecting comprises soldering.

17. The method of claim 13, wherein the spanner is copper.

18. The method of claim 13, wherein removing the layer of the first pipe section includes drilling a hole at the first connection location.

19. A method for establishing or restoring electrical continuity between metal pipe sections in pipeline rehabilitation, the method comprising:
  from an inside of a pipe having at least a first pipe section and a second pipe section:
    removing a layer of the first pipe section at a first connection location;
    removing a layer of the second pipe section at a second connection location;
    electrically connecting a spanner to the first pipe section at the first connection location and to the second pipe section at the second connection location; and
  rehabilitating the pipe to give the pipe a new inner diameter, wherein a first radial distance from the inside of the pipe to the innermost extent of the spanner is less than a second radial distance from the inside of the pipe to the new inner diameter.

* * * * *